United States Patent
Dragon et al.

[15] 3,662,725
[45] May 16, 1972

[54] EVAPORATION EMISSION CONTROL DEVICE FOR FUEL TANKS

[72] Inventors: James W. Dragon, Arlington Heights; Alfred G. Ocken, Franklin Park, both of Ill.

[73] Assignee: Motorola, Inc., Franklin Park, Ill.

[22] Filed: Aug. 26, 1970

[21] Appl. No.: 67,086

[52] U.S. Cl. ............................. 123/136, 137/202, 137/44
[51] Int. Cl. ............................. F16k 45/02, F16k 31/18
[58] Field of Search ................ 137/202, 430, 44; 123/136; 220/44 B, 44 R

[56] References Cited

UNITED STATES PATENTS

| 3,500,843 | 3/1970 | White | 220/44 X |
|---|---|---|---|
| 2,884,943 | 5/1959 | Dobrick | 137/202 |
| 3,554,175 | 1/1971 | Sarto | 123/136 |

FOREIGN PATENTS OR APPLICATIONS

| 506,788 | 9/1930 | Germany | 137/430 |

Primary Examiner—Alan Cohan
Attorney—Mueller & Aichele

[57] ABSTRACT

An evaporation control device consists of two spherical balls which float in a housing defining a cavity so that the balls move up and down in accordance with the fuel level in the tank to allow the top ball to engage a conical seat to seal the vented passageway from the fuel tank to the engine. The spherical contact surfaces between the two balls allow quick and easy movement of the top ball to seal the opening at once where gasoline moves toward the opening.

4 Claims, 2 Drawing Figures

PATENTED MAY 16 1972
3,662,725
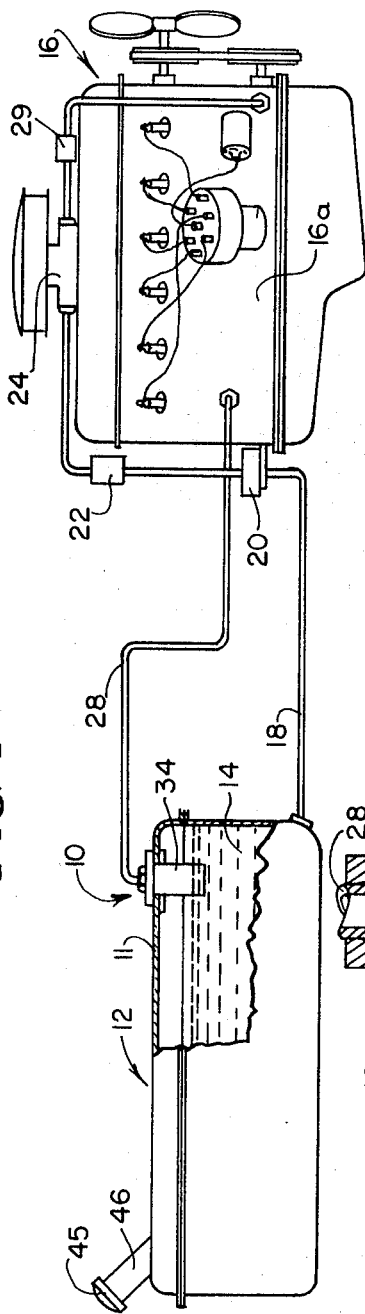
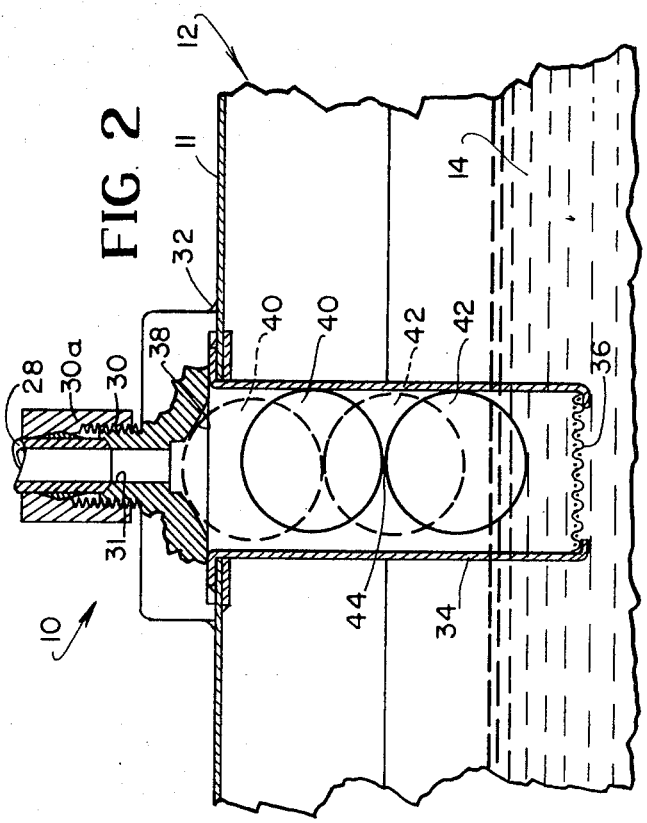
Inventors
JAMES W. DRAGON
ALFRED G. OCKEN
BY
*Mueller & Aichele* ATTYS.

EVAPORATION EMISSION CONTROL DEVICE FOR FUEL TANKS

BACKGROUND OF THE INVENTION

This invention relates to a device for controlling the evaporation losses of gasoline from an automobile fuel tank, and more particularly, controls the hydrocarbon evaporation of gasoline to thereby eliminate air pollution caused by such evaporation.

It has been established that the use of automobiles constitutes a significant source of atmospheric pollution, leading to a smog problem in many large cities. In many cases the unburnt hydrocarbons, as well as fuel evaporation, appear to be the major source of this pollution. While much of the pollution emissions caused by automobiles come from unburnt hydrocarbons from the automobile exhaust system, it has been noted that a substantial amount of pollution is caused by evaporation of the gasoline used to supply power to the engine. That is, while driving an automobile substantially contributes to the pollution of our environment, it has been discovered that a substantial amount of pollution will occur even if the automobiles are not driven. The evaporation of the gasoline from the fuel tank as a pollutant has been investigated for the past several years and several rather elaborate devices and arrangements have been utilized in an attempt to overcome the problem.

For example, one method of venting the fuel tank was by a direct connection of a conduit between the fuel tank and the crankcase of the engine so that fuel vapor, together with oil vapor, can be withdrawn from the crankcase through the PCV valve of the engine into the carburetor in the usual and well-known manner. This direct fuel connection presented problems in that, in some instances, raw fuel would be drawn through this conduit connection. To eliminate the possibility of raw fuel going through the conduit, an elaborate control valve apparatus was devised which was relatively expensive and complicated.

SUMMARY OF THE INVENTION

Accordingly, it is an object of this invention to provide an improved evaporation control valve for a fuel tank to open and close the conduit passageway from the fuel tank under certain selected conditions.

Another object of this invention is to provide an improved evaporation control valve which is inexpensive to manufacture and efficient and reliable in operation.

BRIEF DESCRIPTION OF THE DRAWINGS

FIG. 1 illustrates the evaporation emission control device of this invention utilized in a fuel system of a reciprocating internal combustion engine; and FIG. 2 is an enlarged, partially sectional view of the control device of this invention with floatation balls shown in solid line in one condition, to allow the vapor to pass through the valve, and shown in dotted lines in another condition, to illustrate a valve closed condition.

DESCRIPTION OF THE PREFERRED EMBODIMENT

Referring now to FIG. 1, an evaporation emission control device constructed in accordance with the principals of this invention is designated generally by reference numeral 10 and is shown mounted to the top wall 11 of a fuel tank 12. The evaporation emission control device 10 is shown in a conventional system where the fuel tank 12 holds a quantity of gasoline 14 to supply fuel to a conventional internal combustion reciprocating engine 16 through a fuel line 18. Interposed in the fuel line 18 is a fuel pump 20 and a fuel filter 22 to pump gasoline and filter the same before it is delivered to a carburetor 24.

The evaporation emission control device 10 is in fluid communication with the crankcase area designated generally by reference numeral 16a, through a conduit 28. The evaporation emission control device 10 allows gasoline vapor to escape from the fuel tank 12 through the conduit 28 and into the crankcase 16a as long as the emission control device is in an open valve condition. However, should the fuel tank 12 be completely filled with gasoline, or should an automobile containing the engine and fuel tank of FIG. 1 assume an angular attitude, going uphill or downhill, where gasoline may pass through the conduit 28, the evaporation emission control device 10 automatically and quickly will close so that no gasoline or vapor will pass through the conduit 28. When the automobile again assumes its normal attitude, the emission control device 10 will pass vapor to the crankcase area 16a once again. Gasoline vapor which enters the crankcase area 16a may be removed from the crankcase, together with oil vapor, through the standard PCV control valve 29 in the usual and well-known manner. However, it will be understood that the fuel vapor may be removed by any suitable means.

For a better understanding of the evaporation emission control device 10 of this invention, reference is now made to FIG. 2 which illustrates an enlarged, partially sectional view of the device secured to the top wall portion of the fuel tank 12. Here, the evaporation emission control device 10 includes threads 30 to which a fitting 30a can be attached so that the conduit 28 can be connected thereto. An opening 31 passes through the threaded end 30 to be in fluid communication with the conduit 28. The evaporation emission control device 10 may be fastened to the top wall 11 of the fuel tank 12 by solder or brazing it as indicated by reference numeral 32, or by any other suitable means of fastening. The evaporation emission control device 10 has a housing portion 34 extending into the fuel tank area, this housing portion being illustrated herein as a cylindrical member with a foraminous wall 36 at one end thereof through which gaoline can flow easily. In the illustrated embodiment, the foraminous wall may be a screen which allows gasoline freely to enter the cylindrical member when the fuel level is high or when the automobile takes an angular attitude which tilts or otherwise causes fuel to come in contact with the device 10. A conical seat 38 is formed at the uppermost end of the housing portion 34. This conical seat, together with the threaded portion 30 and the housing portion 34, may be an integral unit machined or cast in one piece, or it may be several components fabricated together.

The evaporation emission control device 10 includes a first spherical member 40, which may or may not be floatable in the gasoline 14, arranged to engage the conical seat 38 and close off the passageway 31 extending into the conduit 28. The spherical member 40 acts as a valve to control opening and closing the passageway between the fuel tank 12 and the crankcase 16a. A second spherical member 42, which is floatable within the gasoline 14 and in any event floatable sufficient to support the first spherical member 40 fully above the fuel level, whether or not the first spherical member 40 is floatable in and of itself.

A point contract 44 between the two spherical members 40 and 42 provide an almost frictionless support connection between these two balls so that the first spherical member 40 will readily engage the conical seat 38 under any angle of inclination from between 0° to 30° off the vertical. Therefore, if the automobile is going uphill or downhill and gasoline tends to enter the conduit passageway 28, or as a result of gasoline moving rapidly from side-to-side or front-to-back because of acceleration or stopping of the automobile, the upper ball 40 will quickly engage the seat 38 to close off the conduit passageway 28 so no raw gasoline will pass to the crankcase.

By utilizing the double ball system, the upper ball 40 is completely self-aligning with the seat 38 regardless of the rate at which gasoline is moved about in the tank. Also, since the ball 40 is free to rotate in any direction, the ball will not wear out in any given spot and, as such, will last a long time regardless of how often it engages the seat 38. Also, it will be noted that no lubricant, other than gasoline itself, is needed.

What has been described is a simple and effective evaporation emission control device which prevents raw gasoline from entering the crankcase of the engine when gasoline rises to the level of an opening communicating the fuel tank with the engine while allowing for transmitting gasoline vapors from the fuel tank 12 to the engine 16. When utilizing the evaporation emission control device of this invention, it may be desirable to utilize a pressure cap 45 on the filler neck 46 of the fuel tank 12.

Accordingly, it will be understood that variations and modifications of this invention may be effected without departing from the spirit and scope disclosed and claimed herein.

We claim:

1. A system for controlling the evaporation emissions from a fuel tank having a filler neck and a fuel line for delivering the fuel from the tank to the engine, including in combination, vent means including a housing extending into the fuel tank, said housing defining a cavity and having a foraminous wall portion exposing the cavity to the interior of the fuel tank, conduit means connecting the housing to the engine for transfer of volatile gas fumes thereto for disposal therein, ball seat means formed in a wall of said housing and having an opening connecting the cavity thereof to said conduit means, a spherical valve member positioned in said housing and engageable with said ball seat means for sealing said conduit means, and float means positioned in said housing and having a spherical surface portion for engaging said spherical valve member to move said spherical valve member into engagement with said ball seat means when said float means is elevated by the fuel level within the fuel tank being tilted from a horizontal reference plane through a plurality of angles up to at least 30° from said reference plane.

2. The device of claim 1 wherein said housing is a cylindrical member open at one end thereof which extends into said fuel tank and said foraminous wall is a screen which covers the open end of said cylindrical member.

3. The device of claim 1 wherein said float means is a floatable ball.

4. The device of claim 1 wherein said housing is a cylindrical member open at one end and said foraminous wall is a screen covering said open end, said cylindircal member having a given diameter, said spherical member having a diameter greater than half the diameter of said given diameter of said cylindrical member, and said float means has a diameter greater than one half the diameter of said cylindrical member.

* * * * *